US 9,864,658 B1

(12) United States Patent
Barcello

(10) Patent No.: US 9,864,658 B1
(45) Date of Patent: Jan. 9, 2018

(54) AUTOMATION OF DEDUPLICATION STORAGE CAPACITY SIZING AND TRENDING ANALYSIS

(71) Applicant: VCE Company, LLC, Richardson, TX (US)

(72) Inventor: Michael Barcello, Southbury, CT (US)

(73) Assignee: VCE Company, LLC, Richardson, TX (US)

( * ) Notice: Subject to any disclaimer, the term of this patent is extended or adjusted under 35 U.S.C. 154(b) by 384 days.

(21) Appl. No.: 14/557,045

(22) Filed: Dec. 1, 2014

(51) Int. Cl.
*G06F 17/30* (2006.01)
*G06F 11/14* (2006.01)

(52) U.S. Cl.
CPC .... *G06F 11/1453* (2013.01); *G06F 17/30156* (2013.01)

(58) Field of Classification Search
CPC ......... G06F 17/30082; G06F 17/30088; G06F 17/30156; G06F 17/30194; G06F 17/3053; G06F 17/30221; G06F 17/30327; G06F 17/30091; G06F 17/30144; G06F 17/30345; G06F 11/2082; G06F 11/1469; G06F 3/0641; G06F 3/0605; G06F 17/30; G06F 11/1453; G06F 17/30867; G06F 17/30864; G06F 17/30554; G06F 17/2235; G06F 17/30882; G06F 17/30896; G06F 17/30424; G06F 3/0484; G06F 17/3097; F06F 17/30327
See application file for complete search history.

(56) References Cited

U.S. PATENT DOCUMENTS

| | | | | |
|---|---|---|---|---|
| 7,519,635 B1 * | 4/2009 | Haustein | ........... | G06F 17/30159 707/E17.004 |
| 7,539,710 B1 * | 5/2009 | Haustein | ............. | G06F 11/1453 707/E17.004 |
| 8,095,756 B1 * | 1/2012 | Somavarapu | ....... | G06F 11/1453 711/162 |
| 8,983,952 B1 * | 3/2015 | Zhang | ................ | G06F 11/1453 707/736 |
| 9,244,976 B1 * | 1/2016 | Zhang | ............... | G06F 17/30442 707/812 |
| 9,361,321 B1 * | 6/2016 | Auchmoody | ..... | G06F 17/30289 707/E17.032 |
| 9,383,936 B1 * | 7/2016 | Freitas | .................. | G06F 3/0641 707/E17.001 |
| 9,626,253 B1 * | 4/2017 | Zhang | ................ | G06F 11/1458 707/E17.002 |
| 9,626,373 B2 * | 4/2017 | Ram | ................ | G06F 17/30156 707/E17.005 |

(Continued)

*Primary Examiner* — Anh Ly
(74) *Attorney, Agent, or Firm* — Womble Bond Dickinson (US) LLP; Jeffrey R. McFadden

(57) ABSTRACT

A method for automation of deduplication storage capacity sizing and trending analysis is provided. The method includes collecting all file system directories of at least one system for which a deduplication backup storage capacity for files in the all file system directories is to be determined. The method includes determining file counts, file sizes and file types of the files in the all file system directories and obtaining a deduplication ratio of each of the file types. The method includes deriving the deduplication backup storage capacity from the file counts, the file sizes and the file types of the files in the all file system directories, based on the deduplication ratio of each of the file types.

20 Claims, 4 Drawing Sheets

(56) References Cited

U.S. PATENT DOCUMENTS

| | | | | |
|---|---|---|---|---|
| 2007/0136384 A1* | 6/2007 | Hepper | ................ | G06F 3/0605 |
| | | | | 707/E17.032 |
| 2010/0205158 A1* | 8/2010 | Dybas | ............... | G06F 17/30156 |
| | | | | 707/692 |
| 2010/0332818 A1* | 12/2010 | Prahlad | ................ | G06F 17/302 |
| | | | | 713/150 |
| 2011/0080834 A1* | 4/2011 | Hirota | .................... | H04L 47/10 |
| | | | | 370/236 |
| 2011/0161297 A1* | 6/2011 | Parab | ............... | G06F 17/30156 |
| | | | | 707/646 |
| 2012/0016845 A1* | 1/2012 | Bates | .................... | G06F 3/0608 |
| | | | | 707/692 |
| 2012/0150826 A1* | 6/2012 | Vijayan Retnamma | ........ | G06F 17/30312 |
| | | | | 707/692 |
| 2012/0166478 A1* | 6/2012 | Das | ................... | G06F 17/30442 |
| | | | | 707/769 |
| 2012/0191670 A1* | 7/2012 | Kennedy | ............. | G06F 11/1453 |
| | | | | 707/692 |
| 2013/0086007 A1* | 4/2013 | Bandopadhyay | . | G06F 17/30156 |
| | | | | 707/692 |
| 2013/0110793 A1* | 5/2013 | Chavda | ............. | G06F 17/30159 |
| | | | | 707/692 |
| 2013/0212074 A1* | 8/2013 | Romanski | ........... | G06F 12/0253 |
| | | | | 707/692 |
| 2013/0246334 A1* | 9/2013 | Ahuja | ................ | G06F 17/30713 |
| | | | | 707/600 |
| 2014/0006354 A1* | 1/2014 | Parkison | ........... | G06F 17/30194 |
| | | | | 707/649 |
| 2014/0095439 A1* | 4/2014 | Ram | ................. | G06F 17/30159 |
| | | | | 707/640 |
| 2014/0114933 A1* | 4/2014 | Chandrasekarasastry | | G06F 12/02 |
| | | | | 707/692 |
| 2014/0188805 A1* | 7/2014 | Vijayan | ............... | G06F 11/1453 |
| | | | | 707/646 |
| 2014/0258237 A1* | 9/2014 | Dinkar | ................ | G06F 11/1469 |
| | | | | 707/645 |
| 2014/0280382 A1* | 9/2014 | Gabay | ................. | G06Q 10/087 |
| | | | | 707/812 |
| 2015/0293817 A1* | 10/2015 | Subramanian | .... | G06F 17/30212 |
| | | | | 707/645 |
| 2015/0310035 A1* | 10/2015 | Godman | ........... | G06F 17/30221 |
| | | | | 707/751 |
| 2016/0004721 A1* | 1/2016 | Iyer | ................... | G06F 17/30088 |
| | | | | 707/649 |
| 2016/0078068 A1* | 3/2016 | Agrawal | ........... | G06F 17/30303 |
| | | | | 707/692 |
| 2016/0306819 A1* | 10/2016 | Agrawal | ........... | G06F 17/30303 |
| | | | | 707/E17.004 |
| 2016/0371296 A1* | 12/2016 | Passey | ............. | G06F 17/30194 |
| | | | | 707/751 |
| 2016/0371297 A1* | 12/2016 | Okun | ................ | G06F 17/30221 |
| | | | | 707/751 |

* cited by examiner

AUTOMATION OF DEDUPLICATION STORAGE CAPACITY SIZING AND TRENDING ANALYSIS

BACKGROUND

Deduplication reduces the amount of storage needed for backup of data in a client system. It is vital that deduplication backup storage be available in sufficient amounts to support ongoing backup regimens, file size and file count growth in a system, unexpected or unusually large files, equipment failure and data retention needs. It is difficult to size a new deduplication backup system, and it is also difficult to estimate when the capacity of an existing deduplication backup system will run out. Deduplication capacity is not linearly proportional to the amount of data being backed up, since relative amounts of data reduction in deduplication may vary considerably. Often, deduplication storage capacity is manually estimated for systems. One known estimating tool, the EMC Avamar™ CATTOOL, applies a modified client and runs an actual or simulated deduplication against some fraction of the total data on a customer system as a sample. The tool produces a log file that can then be used to determine the data commonality or deduplication ratio of this sample. Accurate use of this tool relies on customers identifying representative data, which they may or may not do correctly, and which is time-consuming for the customers. Consequences for inaccurately predicting or allocating deduplication storage capacity, or failing to arrange for a timely upgrade of such capacity, can include system downtime.

SUMMARY

In some embodiments a method for automation of deduplication storage capacity sizing and trending analysis is provided. The method includes collecting all file system directories of at least one system for which a deduplication backup storage capacity for files in the all file system directories is to be determined. The method includes determining file counts, file sizes and file types of the files in the all file system directories and obtaining a deduplication ratio of each of the file types. The method includes deriving the deduplication backup storage capacity from the file counts, the file sizes and the file types of the files in the all file system directories, based on a typical or averaged deduplication ratio of each of the file types in some embodiments, wherein at least one action of the method is performed by a processor. The embodiments may be implemented as a system and code on a computer readable medium.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A deduplication storage capacity analysis system analyzes file system directories of a system (or systems), and determines the deduplication backup storage capacity for deduplicated backup of the system(s). Derivation of the deduplication backup storage capacity is based on file counts, file sizes, file types of the files to be backed up, and may be further based on deduplication ratios for each file type in some embodiments. Deduplication ratios can be obtained from lookup tables, or from executing a deduplication algorithm on subsets of files for each of the file types. By applying analysis down to a granularity of file types, the analysis system can more accurately predict deduplication storage capacity sizing and analyze trends than can existing manual and tool-based methods. The analysis system can also project capacity utilization, determine a capacity upgrade date, and calculate disaster recovery time from a deduplicated backup. Various embodiments of the analysis system, and related method, are described below, along with deduplication scenarios.

Figure 1:
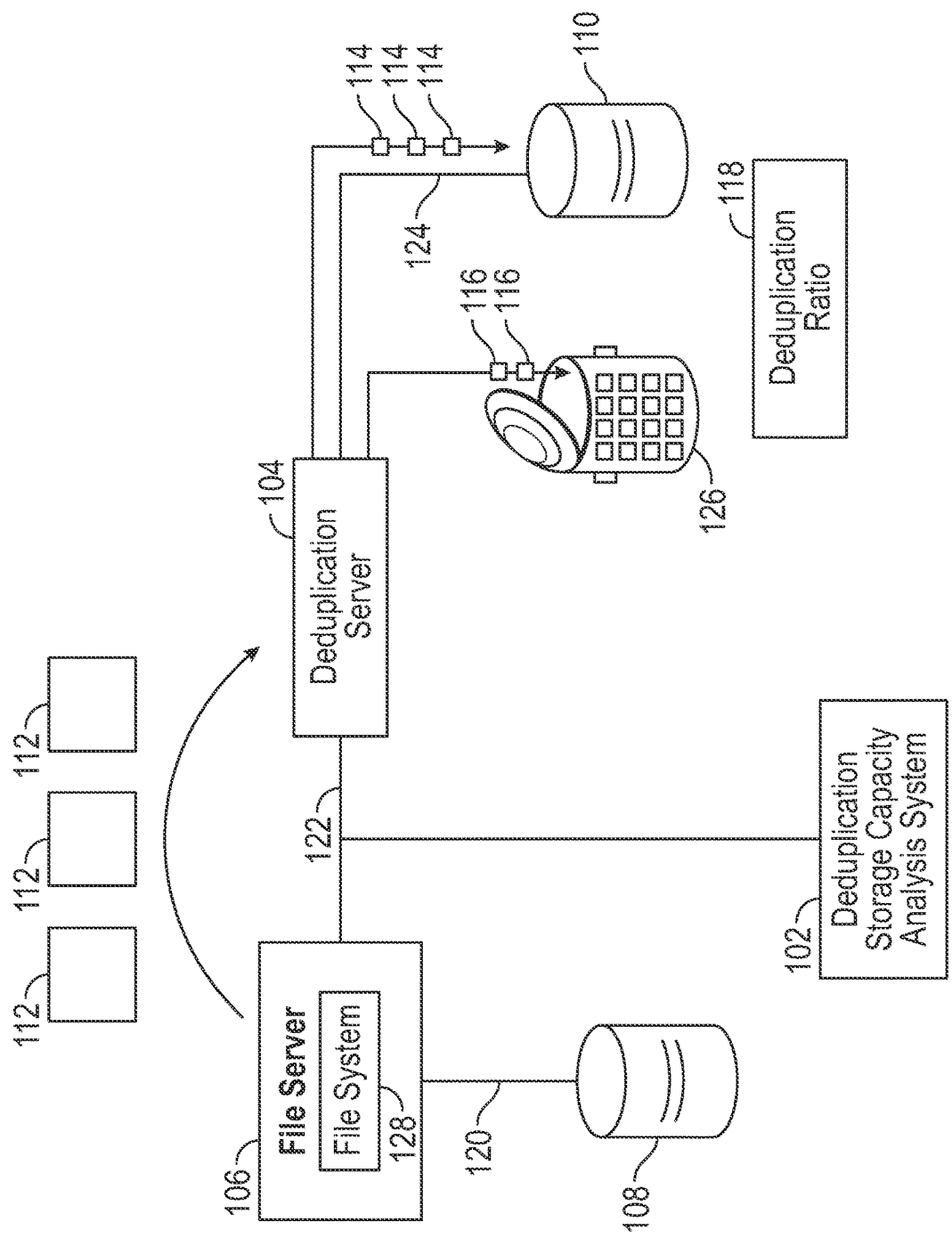
FIG. 1 is a system diagram depicting a file server sending files to a deduplication server for deduplicated backup, with a deduplication storage capacity analysis system analyzing deduplication backup storage capacity, capacity utilization and disaster recovery time in accordance with some embodiments.

FIG. 1 is a system diagram depicting a file server 106 sending files 112 to a deduplication server 104 for deduplicated backup, with a deduplication storage capacity analysis system 102 analyzing deduplication backup storage capacity, capacity utilization, and disaster recovery time. In the deduplication scenario depicted in FIG. 1, the file server 106 consults one or more directories of the file system 128, and reads each file 112 from a storage memory 108. The file server 106 sends each file 112 to the deduplication server 104 via a network 122 coupling the file server 106 and the deduplication server 104. Next, the deduplication server 104 separates the files 112 into data portions 114, storing some of the data portions 114 in a storage memory 110 (usually, dedicated to deduplication backup storage), which is coupled to the deduplication server 104 by a network 124. Some of the data portions 116 are duplicate data portions 116, and are discarded by the deduplication server 104, which shown symbolically as discarding the duplicate data portions 116 into a trashcan 126. It should be appreciated that discarding refers to the duplicate data portions 116 not being written into the deduplication backup storage memory 110. Generally, the deduplication process employs data fingerprints, and the deduplication server 104 performs a fingerprint operation on each of the data portions 114, 116, discarding duplicate data portions 116 which match previously stored fingerprints. In this manner, the deduplication server 104 performs a deduplicated backup of the files in a client system. The above description of deduplication is for purposes of illustration only, and is not meant to limit embodiments of the deduplication storage capacity analysis system 102.

As a result of deduplication, less deduplication backup storage memory 110 is needed than if all of the data portions 114, 116 were stored in a backup storage memory. Various statistics can be applied in deduplication scenarios to determine a deduplication ratio 118. For example, a deduplication ratio 118 of an entire deduplication backup run can be deduced by taking the amount of data that was sourced from the originating system before deduplication, and dividing this amount by the amount of deduplicated data stored, after deduplication. It should be appreciated that this is somewhat analogous to a data compression ratio, which is calculated for data compression. An estimating tool may perform an actual or simulated deduplication on a sample that is a fraction of the total data on a customer system, for which a deduplication ratio 118 can be determined relative to the sample. However, these tools are time consuming and may be inaccurate.

The deduplication storage capacity analysis system 102 determines the deduplication backup storage capacity for deduplicated backup of the system as described in more detail below with reference to FIG. 2. The deduplication storage capacity analysis system 102 is coupled to the file server by the network 122, or by a further network, bus connection or other coupling. In various embodiments, the analysis system 102 could be in a differing server or other computing device as distinct from the file server 106 and the deduplication server 104, or could be combined into the file server 106 or the deduplication server 104. In one embodiment, the deduplication storage capacity analysis system 102 is included in a converged infrastructure environment, such as supported by a Vblock® or other virtual computing device, and is applied to determining deduplication storage capacity for backing up virtual machines and/or virtual appliances. In order to analyze the deduplication storage capacity sizing and trending, the analysis system 102 accesses directories of the file system 128, e.g., via the network 122 and the file server 106.

Figure 2:
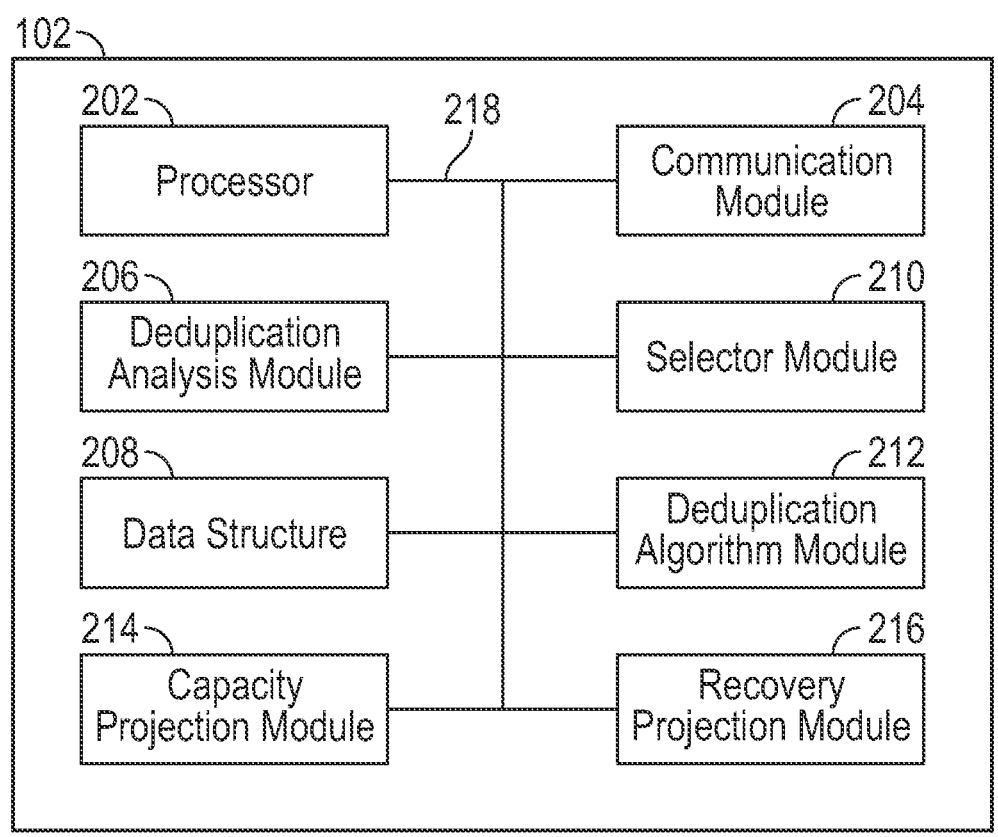
FIG. 2 is a block diagram of contents of a deduplication storage capacity analysis system, in accordance with some embodiments.

FIG. 2 is a block diagram of contents of a deduplication storage capacity analysis system 102, in one embodiment. Various modules 204, 206, 210, 212 can be implemented as software executing on a processor 202, hardware, or firmware, or various combinations thereof in the analysis system 102. The processor 202, the various modules 204, 206, 210, 212 and a data structure 208 are coupled by a bus 218 or other communication coupling. The communication module 204 can be a network communication device, a bus communication device or other mechanism for coupling to further devices and communicating therewith. The data structure 208 can be in various formats as readily devised in keeping with the teachings herein.

Still referring to FIG. 2, the deduplication analysis module 206 collects file system directories for every system to be protected by deduplication backup, and for which a deduplication backup storage capacity is to be determined. For example, the file system 128 of the file server 106 could be accessed via a network 122, and a copy of the file system directory or directories imported into the analysis system 102, and stored in the data structure 208. This process can be repeated for further systems and further directories, to collect file system directories as a set representing all of the files that will be backed up in a deduplication backup run for a particular client system. Next, the deduplication analysis module 206 determines file counts, file sizes, and file types for all of the files in however many directories are in the above-described set of directories. For example, the deduplication analysis module 206 could determine that there are no files of a first file type, a number of files of a second file type, with particular file sizes, and so on. By organizing information from the file system directories in terms of file types, the deduplication analysis module 206 is able to size the deduplication storage capacity (i.e., estimate the amount of deduplication storage needed) in a manner that takes into account the differences in deduplication between differing file types.

For example, video files, image files and audio files, and other compressed files tend to not have much deduplication. That is, the data in these file types has very low amounts of duplicate data, and the deduplication process does not discard much duplicate data portions 116. Video files and audio files thus have low deduplication ratios 118 (i.e., larger than but close to one). That is, the amount of deduplication backup storage memory 110 for these types of files is relatively close to the amount of storage memory 108 consumed at the source for these files. It should be appreciated that any compressed file generally has a low deduplication ratio 118, as compression tends to eliminate duplication. Text files tend to have higher deduplication ratios 118, due to the duplication of words, phrases or letter sequences in text files. Email systems often have even higher deduplication ratios, as a result of copies of emails and copies of attachments. Database files generally do not deduplicate well, and tend to have low deduplication ratios 118. However, variations exist, and some database file types have higher deduplication ratios 118 than others. Application logs, many of which are text based and have repetitive entries, tend to deduplicate well and have higher deduplication ratios 118. Application data can vary as to deduplication tendencies according to the application. For example, MICROSOFT OFFICE™ data and spreadsheet data may have higher deduplication ratios 118 as compared to some types of applications and associated data, and so on. It may be worthwhile to separate application data by file type according to applications of origin. The above description is not meant to be limiting but rather an example of the different types of deduplication tendencies for different file types.

Continuing with operations performed by the analysis system 102 of FIG. 2, the deduplication analysis module 206 obtains deduplication ratios 118 for each file type. For example, the deduplication analysis module 206 obtains a deduplication ratio 118 for text files, or even a first deduplication ratio 118 for a first file type of text files and a second deduplication ratio 118 for a second file type of text files, and a third deduplication ratio 118 for video files or for a third file type of video files, and so on. In some embodiments, the deduplication analysis module 206 looks up deduplication ratios for each file type, and stores this information in the data structure 208. Such information could come from industry averages of deduplication ratios for various file types, e.g., from an internal or external data source. Alternatively, such information could come from ongoing analysis of client data and previous deduplication backup runs performed by the deduplication server 104, e.g., as obtained from communication with the deduplication server 104 via the communication module 204. These embodiments can omit the selector module 210 and the deduplication algorithm module 212.

In further embodiments, the deduplication analysis module 206 of FIG. 2 obtains the deduplication ratio 118 for each file type by performing a deduplication algorithm on a subset of data from each file type. In this embodiment, the selector module 210 auto-selects a subset of files from each file type, by referencing the file system directories earlier collected. For example, the selector module 210 could select a number of text files, a number of audio files, a number of database files, and a number of application data files (or even a number of application data files from a first application, a further number of application data files from a second application and so on). The selection may be system dependent, and the number of files of each file type to select could be a predetermined number (which could be the same or different for different file types), a predetermined fraction of the files of each type, or could be based on a predetermined amount of data for each file type, etc. Then, the deduplication algorithm module 212 executes a deduplication algorithm on each subset of files, i.e., for each file type. For example, the deduplication algorithm could perform all of the steps of an actual deduplication except the storage operation, and track the relative amounts of data that would have been stored. The relative amounts of data that would have been stored can then be compared to the amount of source data, and a deduplication ratio 118 calculated, for each file type based on the subset of data files of that file type. Once a deduplication ratio 118 is obtained for a particular file type, that deduplication ratio 118 is then stored in the data structure 208 as associated with that file type.

Referring to FIGS. 1 and 2, once the deduplication analysis module 206 obtains the deduplication ratios 118 for each file type, e.g., from the data structure 208, one or more lookup tables, or from results of actions of the selector module 210 and the deduplication algorithm module 212 as described above, analysis continues. The deduplication analysis module 206 adds up the total amount of data for each file type, by referencing the file system directories, e.g., as stored in the data structure 208, in some embodiments. This total amount of data for each file type is thus based on the file counts, file sizes, and file types of all of the files in the file system directory or directories. For each file type, the total amount of data of that file type is then divided by the deduplication ratio 118 for that file type, which results in an estimate of the total amount of deduplication backup storage memory 110 needed for storing all of the deduplicated backup data of that file type. This deduplication backup storage capacity, for each of the file types, is then summed across all of the file types. That is, the total amount of deduplication backup storage capacity needed for storing the deduplicated backup data of all of the file types (i.e., all of the files in the client system) is equal to the sum of the amount of deduplication backup storage memory 110 needed for storing all of the deduplicated backup data of each file type.

A margin can be added to the result of the summing, or the result of the summing can be multiplied by a margin ratio in some embodiments. For example, it may be preferable to have twice as much deduplication storage capacity online as compared to the amount of deduplication storage capacity that is consumed in storing the deduplicated data of a client system, so that the client system can expand over time. Users may prefer to not exceed a specified amount of available deduplication storage capacity, for example 75% capacity utilized, with 90% capacity utilized as a danger point at which problems are likely. A two to one margin ratio, or three to one margin, or other margin can be established thusly. The resultant deduplication backup storage capacity, as a total for the client system, with or without margin, can then be presented to a user (e.g., via a user interface) as a result of the above calculations performed by the deduplication analysis module 206. With this result, the analysis system 102 predicts the total amount of deduplication backup storage memory 110 needed for storing all of the deduplicated backup data of the client system.

Still referring to FIGS. 1 and 2, trends can also be tracked by the analysis system 102, and applied to projection and forecasting. In some embodiments, the deduplication storage capacity analysis system 102 has a capacity projection module 214, which projects capacity utilization, e.g., through a trending chart with a projection of consumption. The capacity projection module 214 communicates with the file system 128 via the file server 106, and tracks changes to the file counts (and, in some embodiments the file sizes) for each of the file types, e.g., on a daily, weekly, monthly or other time basis. This information is applied to calculate a rate of increase by file type, as a discreet calculation or a running average or variation thereof. From the rate increase information, the total amount of data for each file type is then projected out over various time spans, e.g., weeks, months or even a year or more. A capacity utilization projection is then made, in which the deduplication analysis module 206 cooperates with the capacity projection module 214. In this cooperation, the projected data amounts for each file type, as determined by the capacity projection module 214, are combined with the deduplication ratios 118 for each file type, and the deduplication analysis module 206 calculates the deduplication backup storage capacity as projected forward by a particular time span, to a particular time (e.g., a date). The projected deduplication backup storage capacity is then compared to the installed deduplication backup storage capacity to form a capacity utilization projection. For example, the present capacity utilization could be one quarter of the total amount of installed deduplication backup storage capacity, and this could increase to one half of the total amount of installed deduplication backup storage capacity in a particular time span. It should be appreciated that such projections are useful in planning and execution of deduplication backup storage capacity.

The capacity projection module 214 of FIG. 2 can be supplied with a target capacity utilization, which the capacity projection module 214 applies to forecast a capacity upgrade date in some embodiments. From the above-described rate increase information, on a per file type basis, the capacity projection module 214 calculates capacity utilization as above, trying various time spans until the projected capacity utilization approaches, meets, or exceeds the target capacity utilization. In other words, a time span is calculated to the moment the projected capacity utilization intersects the target capacity utilization. The associated time span (i.e., the time span which results in achieving the target capacity utilization) is then added to the present date to form a capacity upgrade date. Thus, the capacity upgrade date is the date on which the system is projected to reach the target capacity utilization. Such a projection is useful in planning and execution of upgrades to deduplication backup storage capacity as a lead time exists for obtaining additional storage capacity once ordered. It should be appreciated that alerts may be generated as predetermined thresholds of utilization are exceeded in some embodiments.

In some embodiments, the deduplication storage capacity analysis system 102 has a recovery projection module 216, which calculates a disaster recovery time for a full system restore from deduplicated backup data. The recovery projection module 216 obtains various parameters that are applicable to data recovery from the deduplicated backup. For example, the recovery projection module 216 could look at network bandwidth or throughput of the network 124 that couples the deduplication server 104 and the deduplication backup storage memory 110, the network 122 that couples the deduplication server 104 and the file server 106, and the network 120 that couples the file server and the storage memory 108 from which the files originate and are to be restored. The recovery projection module 216 could also look at network ping time, and various internal performance parameters e.g., in a virtual computing environment such as hosted by a Vblock®, and/or other parameters relating to paths by which data travels before, during and after being reconstituted from the deduplicated backup data. The recovery projection module 216 can analyze how fast data can travel (e.g., data throughput), and bottlenecks along the way, and factor in network and component delays. These factors are then applied to calculations involving how much data is to be restored, for each file type, and what the deduplication ratios are, for each file type, so that the recovery projection module 216 can calculate the amount of time the full system restore would require. This information is helpful in determining whether certain requirements from a service level agreement are being met.

As an example scenario, consider restoring all of the files in the directory or directories of the file system 128 to the storage memory 108, from the deduplicated backup data in the deduplication backup storage memory 110. The recovery projection module 216 analyzes the networks 120, 122, 124 as to respective throughput rates, and determines for file types having low deduplication ratios 118 that the throughput on the network 124 coupling the deduplication server 104 to the deduplication backup storage memory 110 is the limiting factor. Based on the throughput of this network 124, and the total volume of deduplicated backup data for each of the files of those file types, a total amount of time to retrieve all of the deduplicated backup data from the deduplication backup storage memory 110 to the deduplication server 104 can be calculated. Then, the recovery projection module 216 determines that, for file types having high deduplication ratios 118, the throughput on the network 122 coupling the deduplication server and the file server 106 is the limiting factor (i.e., dominates the time delay calculations) as a result of the reconstituted files of these file types having a much larger volume of data. Based on throughput of that network 122, a total amount of time to send all of the reconstituted files of these file types from the deduplication server 104 to the file server 106 can be calculated. Variations on the above examples are readily devised. From the above analysis, the recovery projection module 216 can then calculate recovery times, on a per file type basis, and add these together to project a total recovery time for all of the files of all of the file types in the client system. Such a disaster recovery time for a full system restore is useful in planning for various disaster scenarios, and in determining whether upgrades to bottlenecks so identified are worthwhile. For example, network bandwidths between various connector points, or other parameters, can be studied as to effect each has on the disaster recovery time, and it can be determined whether the recovery system meets expectations or standards, or requirements of a service level agreement.

Figure 3:
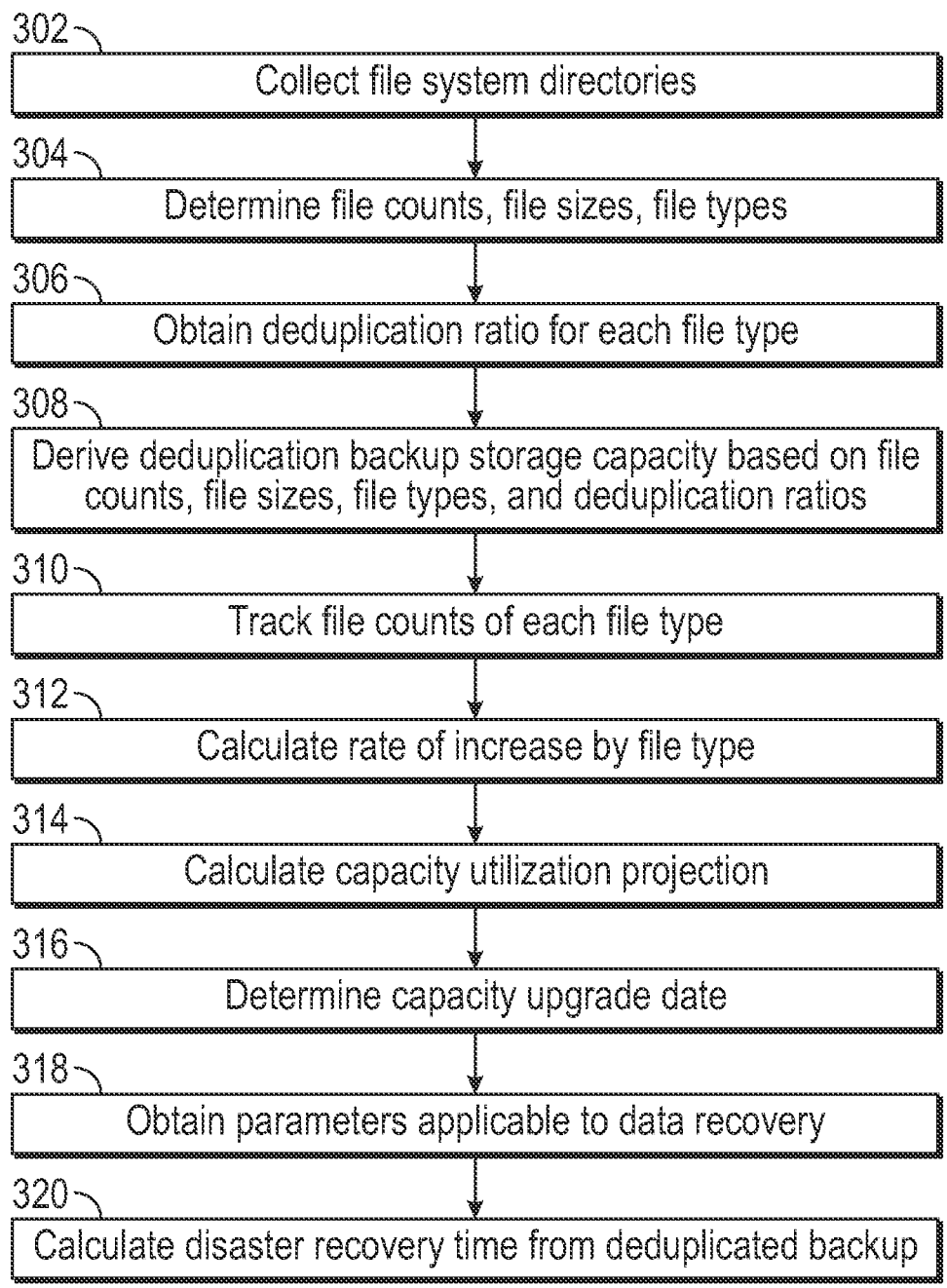
FIG. 3 is a flow diagram of a method for automation of deduplication storage capacity sizing and trending analysis in accordance with some embodiments.

FIG. 3 is a flow diagram of a method for automation of deduplication storage capacity sizing and trending analysis. The method can be practiced on or by embodiments of the deduplication storage capacity analysis system 102, or by a processor, e.g., in a server or a computing device. In an action 302, file system directories are collected. The file system directories can be collected from one or more file servers, and should be all of the file system directories for which the files are to be subjected to a deduplication backup, or for which the deduplication backup storage capacity is to be determined. The file counts, file sizes and file types are determined, in an action 304. This information is gathered from the file system directories. A deduplication ratio is obtained for each file type of these files, in an action 306. The deduplication ratios could be obtained from lookup tables, or by performing a deduplication algorithm on subsets of files of each file type, as described above with reference to FIG. 2.

Still referring to FIG. 3, a deduplication backup storage capacity is derived, in an action 308. The derivation is based on file counts, file sizes and file types, as determined in the action 304. The derivation is further based on the deduplication ratios of the file types, as obtained in the action 306. In order to calculate the deduplication backup storage capacity, the total amount of data of each file type is divided by the deduplication ratio of that file type, and such totals are then summed across all of the file types. Further details of such derivation are discussed above with reference to the deduplication analysis module in FIG. 2. File counts of each file type are tracked, in an action 310. Rate of increase is calculated by file type, in an action 312. Based on these, a capacity utilization projection is calculated, in an action 314. The capacity utilization projection is made by projecting data amounts, for each file type, forward in time and then calculating resultant deduplication backup storage amounts needed for each data type. These amounts are summed to form the projected total deduplication backup storage capacity, which is then followed by forming a ratio of the projected total amount of deduplication backup storage capacity by the installed deduplication backup storage capacity. This is the capacity utilization, as projected. Further details of capacity utilization projection are discussed above with reference to the capacity projection module in FIG. 2.

A capacity upgrade date is determined, in an action 316 of FIG. 3. This is based on a target capacity utilization, and the capacity utilization projections achieved in the action 314. Parameters applicable to data recovery are obtained, in an action 318. These may include network bandwidth or throughput in one or more network paths that data traverses while being restored from deduplicated backup data and transferred as reconstituted data. A disaster recovery time from deduplicated backup is calculated, in an action 320. The disaster recovery time is based on file counts, file sizes and file types of the files in the file system directories, and is further based on the deduplication ratio of each of the file types and the one or more parameters applicable to data recovery as obtained in the action 318. Further details of the disaster recovery time determination are discussed above with reference to the recovery projection module in FIG. 2.

Figure 4:
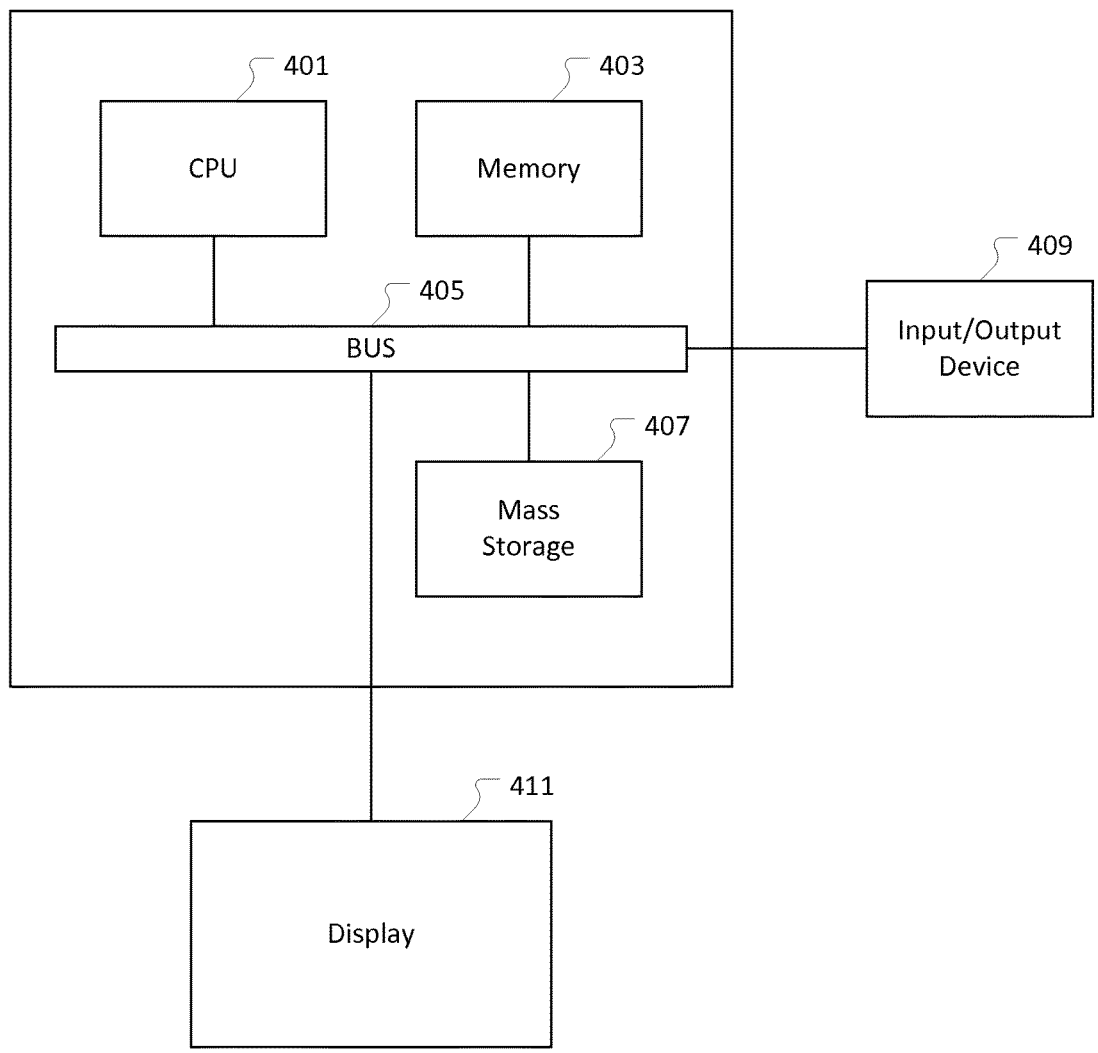
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for deduplication storage capacity analysis in accordance with some embodiments. The computing device includes a central processing unit (CPU) 401, which is coupled through a bus 405 to a memory 403, and mass storage device 407. Mass storage device 407 represents a persistent data storage device such as a disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS-WINDOWS™, UNIX™, LINUX™, iOS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for automated, deduplicated backup of a plurality of files of at least one system, comprising:
   collecting all file system directories of the at least one system for which a deduplication backup storage capacity for files identified in the all file system directories is to be determined;
   determining file counts, file sizes and file types of the files identified in the all file system directories;
   obtaining a deduplication ratio of each of the file types;
   deriving the deduplication backup storage capacity from the file counts, the file sizes and the file types of the files identified in the all file system directories, based on the deduplication ratio of each of the file types; and
   backing up the files identified in the all file system directories based on the derived deduplication backup storage capacity, wherein at least one action of the method is performed by a processor.

2. The method of claim 1, wherein obtaining the deduplication ratio of each of the file types comprises looking up the deduplication ratio for each file type, wherein the deduplication ratio indicates a relative amount of data before deduplication and after deduplication.

3. The method of claim 1, wherein obtaining the deduplication ratio of each of the file types comprises, for each file type of the file types:
   selecting from the all file system directories a plurality of files having each file type;
   executing a deduplication algorithm on the plurality of files having each file type; and
   determining the deduplication ratio of the plurality of files having each file type, which serves as the deduplication ratio of each file type, based on a result of the executing the deduplication algorithm.

4. The method of claim 1, wherein deriving the deduplication backup storage capacity comprises:
   deriving a deduplication backup storage capacity for each of the file types, based on file counts and file sizes of each of the file types and the deduplication ratio of each of the file types;
   summing, across all of the file types, the deduplication backup storage capacity for each of the file types; and
   adding a margin to a result of the summing, or multiplying a result of the summing by a margin ratio.

5. The method of claim 1, further comprising:
   tracking a rate of increase of file counts of files having each of the file types; and
   calculating a capacity utilization projection, based on an installed deduplication backup storage capacity and the derived deduplication backup storage capacity as projected with the tracked rate of increase of file counts of files having each of the file types.

6. The method of claim 1, further comprising:
   obtaining at least one parameter, including network bandwidth or throughput, applicable to data recovery from a deduplicated backup; and
   calculating a disaster recovery time for a full system restore, based on the file counts, the file sizes and the file types of the files in the all file system directories, the deduplication ratio of each of the file types, and the at least one parameter.

7. The method of claim 1, wherein the file types and the deduplication ratio of each of the file types satisfy at least one of:
   text files use less deduplication backup storage than video, audio or image files, relative to file size;
   application logs use less deduplication backup storage than database files, relative to file size; or
   application data files are separated by file types according to application, with differing deduplication ratios.

8. A tangible, non-transitory, computer-readable media having instructions thereupon which, when executed by a processor, cause the processor to perform a method for automated, deduplicated backup of a plurality of electronic files of at least one system, the method comprising:
   collecting all file system directories of at least one system for which a deduplication backup storage capacity for files identified in the all file system directories is to be determined;
   determining file counts, file sizes and file types of the files identified in the all file system directories;
   obtaining a deduplication ratio of each of the file types;
   deriving the deduplication backup storage capacity from the file counts, the file sizes and the file types of the files identified in the all file system directories, based on the deduplication ratio of each of the file types; and
   backing up the files identified in the all file system directories based on the derived deduplication backup storage capacity.

9. The computer-readable media of claim 8, wherein obtaining the deduplication ratio of each of the file types comprises looking up the deduplication ratio for each file type, wherein the deduplication ratio indicates a relative amount of data before and after deduplication.

10. The computer-readable media of claim 8, wherein obtaining the deduplication ratio of each of the file types comprises, for each file type of the file types:
   selecting from the all file system directories a plurality of files having each file type;
   executing a deduplication algorithm on the plurality of files having each file type; and
   determining the deduplication ratio of the plurality of files having each file type, which serves as the deduplication ratio of each file type, based on a result of the executing the deduplication algorithm.

11. The computer-readable media of claim 8, wherein deriving the deduplication backup storage capacity comprises:
   deriving a deduplication backup storage capacity for each of the file types, based on file counts and file sizes of each of the file types and the deduplication ratio of each of the file types;
   summing, across all of the file types, the deduplication backup storage capacity for each of the file types; and
   adding a margin to a result of the summing, or multiplying a result of the summing by a margin ratio.

12. The computer-readable media of claim 8, further comprising:
   tracking a rate of increase of file counts of files having each of the file types; and
   calculating a capacity utilization projection, based on an installed deduplication backup storage capacity and the derived deduplication backup storage capacity as projected with the tracked rate of increase of file counts of files having each of the file types.

13. The computer-readable media of claim 8, further comprising:
   obtaining at least one parameter, including network bandwidth or throughput, applicable to data recovery from a deduplicated backup; and
   calculating a disaster recovery time for a full system restore, based on the file counts, the file sizes and the file types of the files in the all file system directories, the deduplication ratio of each of the file types, and the at least one parameter.

14. A system for automated, deduplicated backup of a plurality of files of at least one system, comprising:
   a processor, configured to couple to a file system; and
   the processor configured to perform actions, including:
   collecting all file system directories of at least one system for which a deduplication backup storage capacity for files identified in the all file system directories is to be determined;
   determining file counts, file sizes and file types of the files identified in the all file system directories;
   obtaining a deduplication ratio of each of the file types; and
   deriving the deduplication backup storage capacity from the file counts, the file sizes and the file types of the files identified in the all file system directories, based on the deduplication ratio of each of the file types; and
   backing up the files identified in the all file system directories based on the derived deduplication backup storage capacity.

15. The system of claim 14, wherein obtaining the deduplication ratio of each of the file types comprises looking up the deduplication ratio for each file type, wherein the deduplication ratio indicates a relative amount of data before and after deduplication.

16. The system of claim 14, wherein obtaining the deduplication ratio of each of the file types comprises, for each file type of the file types:
   selecting from the all file system directories a plurality of files having each file type;
   executing a deduplication algorithm on the plurality of files having each file type; and
   determining the deduplication ratio of the plurality of files having each file type, which serves as the deduplication ratio of each file type, based on a result of the executing the deduplication algorithm.

17. The system of claim 14, wherein deriving the deduplication backup storage capacity comprises:
   deriving a deduplication backup storage capacity for each of the file types, based on file counts and file sizes of each of the file types and the deduplication ratio of each of the file types;
   summing, across all of the file types, the deduplication backup storage capacity for each of the file types; and
   adding a margin to a result of the summing, or multiplying a result of the summing by a margin ratio.

18. The system of claim 14, wherein the actions further comprise:
   tracking a rate of increase of file counts of files having each of the file types; and
   calculating a capacity utilization projection, based on an installed deduplication backup storage capacity and the derived deduplication backup storage capacity as projected with the tracked rate of increase of file counts of files having each of the file types.

19. The system of claim 14, wherein the actions further comprise:
   obtaining at least one parameter, including network bandwidth or throughput, applicable to data recovery from a deduplicated backup; and
   calculating a disaster recovery time for a full system restore, based on the file counts, the file sizes and the file types of the files in the all file system directories, the deduplication ratio of each of the file types, and the at least one parameter.

20. The system of claim 14, wherein the file types and the deduplication ratio of each of the file types satisfy at least one of:
   text files use less deduplication backup storage than video, audio or image files, relative to file size;
   application logs use less deduplication backup storage than database files, relative to file size; or
   application data files are separated by file types according to application, with differing deduplication ratios.

* * * * *